US012591636B2

(12) United States Patent
Wang et al.

(10) Patent No.: US 12,591,636 B2
(45) Date of Patent: Mar. 31, 2026

(54) BOOSTING AND MATRIX FACTORIZATION

(71) Applicant: Google LLC, Mountain View, CA (US)

(72) Inventors: Gang Wang, Frederick, MD (US);
Pengyu He, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 952 days.

(21) Appl. No.: 17/773,650

(22) PCT Filed: Mar. 26, 2021

(86) PCT No.: PCT/US2021/024274
§ 371 (c)(1),
(2) Date: May 2, 2022

(87) PCT Pub. No.: WO2022/203678
PCT Pub. Date: Sep. 29, 2022

(65) Prior Publication Data
US 2023/0050538 A1     Feb. 16, 2023

(51) Int. Cl.
*G06F 18/241* (2023.01)
*G06N 20/00* (2019.01)

(52) U.S. Cl.
CPC ........... *G06F 18/241* (2023.01); *G06N 20/00* (2019.01)

(58) Field of Classification Search
CPC .................................................... G06F 18/241
USPC .......................................................... 706/12
See application file for complete search history.

(56) References Cited

U.S. PATENT DOCUMENTS

| | | | |
|---|---|---|---|
| 10,248,664 | B1 | 4/2019 | Shen et al. |
| 2007/0094180 | A1 | 4/2007 | Rifkin et al. |
| 2019/0273510 | A1 | 9/2019 | Elkind et al. |
| 2019/0354894 | A1* | 11/2019 | Lazovich ................. G06E 1/00 |

(Continued)

FOREIGN PATENT DOCUMENTS

| | | | |
|---|---|---|---|
| CN | 110889458 | | 3/2020 |
| CN | 111487573 A | * | 8/2020 |

(Continued)

OTHER PUBLICATIONS

Office Action in Indian Appln. No. 202227025327, mailed on Apr. 1, 2025, 8 pages (with English translation).

(Continued)

*Primary Examiner* — Ruay Ho
(74) *Attorney, Agent, or Firm* — Fish & Richardson P.C.

(57) ABSTRACT

Methods, systems, and apparatus, including computer programs encoded on a computer storage medium, for presenting a new machine learning model architecture. In some aspects, the methods include obtaining a training dataset with a plurality of training samples that includes feature variables and output variables. A first matrix is generated using the training dataset which is a sparse representation of the training dataset. Generating the first matrix can include generating a categorical representation of numeric features and an encoded representation of the categorical features. The methods further include generating a second, third and a fourth matrix. Each feature of the first matrix is then represented using a vector that includes a multiple adjustable parameters. The machine learning model can learn by adjusting values of the adjustable parameters using a combination of a loss function the fourth matrix, and the first matrix.

20 Claims, 4 Drawing Sheets

400

(56) References Cited

U.S. PATENT DOCUMENTS

| | | | |
|---|---|---|---|
| 2019/0385063 | A1 | 12/2019 | Yu et al. |
| 2021/0256068 | A1 * | 8/2021 | Larlus ............... G06F 16/90332 |

FOREIGN PATENT DOCUMENTS

| | | | | |
|---|---|---|---|---|
| CN | 110059439 B | * | 3/2022 | ............. G06F 17/18 |
| JP | 2021-504844 | | 2/2021 | |
| WO | WO-2021158313 A1 | * | 8/2021 | ............. G06N 20/00 |
| WO | WO-2022146546 A1 | * | 7/2022 | ............. G06F 18/211 |

OTHER PUBLICATIONS

Christoph Molnar, "Interpretable machine learning" 2nd ed., Sep. 2022, 317 pages.
Cerda et al., "Encoding high-cardinality string categorical variables," IEEE Transactions on Knowledge and Data Engineering, submitted on Jul. 3, 2019, arXiv:1907.01860v1, 1-13.
Christoph Molnar, "Interpretable machine learning" 2nd ed., Sep. 2022, Chapter 3, 5 pages.
Guo et al., "Quantization based fast inner product search." Artificial intelligence and statistics. PMLR, May 2, 2016, 482-490.
Guo et al., "Accelerating Large-Scale Inference with Anisotropic Vector Quantization." submitted on Aug. 27, 2019, arXiv preprint arXiv:1908.10396, 18 pages.
International Search Report and Written Opinion in International Appln. No. PCT/US2021/024274, dated Dec. 23, 2021, 15 pages.
Kaggle.com [online], "Display Advertising Challenge" Jun. 24, 2014, retrieved on Oct. 3, 2022, retrieved from URL <https://www.kaggle.com/c/criteo-display-ad-challenge/overview/description>, 1 page.
Kaggle.com [online], "Topic 10. Gradient Boosting" Jun. 2018, retrieved on Oct. 3, 2022, retrieved from URL <https://www.kaggle.com/code/kashnitsky/topic-10-gradient-boosting/notebook>, 1 page.
Kaggle.com [online], "Using Categorical Data with One Hot Encoding" Sep. 2017, retrieved on Oct. 3, 2022, retrieved from URL <https://www.kaggle.com/code/dansbecker/using-categorical-data-with-one-hot-encoding/notebook>, 1 page.
Li et al., "FEXIPRO: fast and exact inner product retrieval in recommender systems." Proceedings of the 2017 ACM International Conference on Management of Data, May 9, 2017, 1-16.
Michael Kleber, "Turtle Dove" <https://github.com/WICG/turtledove>, submitted on Jan. 16, 2020, 2 pages.
Synced Review, "Tree Boosting With XGBoost—Why Does XGBoost Win "Every" Machine Learning Competition?" <https://medium.com/syncedreview/tree-boosting-with-xgboost-why-does-xgboost-win-every-machine-learning-competition-ca8034c0b283>, submitted on Oct. 22, 2017, 27 pages.
Wikipedia.org [online], "Feature (machine learning)" Dec. 2004, retrieved on Sep. 30, 2022, retrieved from URL <https://en.wikipedia.org/wiki/Feature_(machine learning)>, 2 pages.

Wikipedia.org [online], "Gradient Boosting" Mar. 2010, retrieved on Sep. 30, 2022, retrieved from URL <https://en.wikipedia.org/wiki/Gradient_boosting>, 10 pages.
Wikipedia.org [online], "Gradient Descent" Mar. 2003, retrieved on Sep. 30, 2022, retrieved from URL <https://en.wikipedia.org/wiki/Gradient_descent>, 7 pages.
Wikipedia.org [online], "Logarithm" Aug. 2001, retrieved on Sep. 30, 2022, retrieved from URL <https://en.wikipedia.org/wiki/Logarithm>, 29 pages.
Wikipedia.org [online], "Matrix Factorization (recommender systems): Revision history" Jun. 2018, retrieved on Sep. 30, 2022, retrieved from URL <https://en.wikipedia.org/wiki/Matrix_factorization_(recommender_systems)>, 6 pages.
Wikipedia.org [online], "Mean squared error" Mar. 2003, retrieved on Sep. 30, 2022, <https://en.wikipedia.org/wiki/Mean squared_error>, 7 pages.
Wikipedia.org [online], "Netflix Prize" Feb. 2007, retrieved on Sep. 30, 2022, retrieved from URL <https://en.wikipedia.org/wiki/Netflix_Prize>, 8 pages.
Wikipedia.org [online], "Newton's method in optimization" Dec. 2004, retrieved on Sep. 30, 2022, retrieved from URL <https://en.wikipedia.org/wiki/Newton's_method_in_optimization>, 5 pages.
Wikipedia.org [online], "Overdetermined system" Mar. 2007, retrieved on Sep. 30, 2022, retrieved from URL <https://en.wikipedia.org/wiki/Overdetermined_system>, 5 pages.
Wikipedia.org [online], "Quantile" May 2001, retrieved on Oct. 3, 2022, retrieved from URL <https://en.wikipedia.org/wiki/Quantile>, 9 pages.
Wikipedia.org [online], "Residual sum of squares" Aug. 2005, retrieved on Oct. 3, 2022, retrieved from URL <https://en.wikipedia.org/wiki/Residual_sum_of_squares>, 3 pages.
Wikipedia.org [online], "Singular value decomposition" Oct. 2002, retrieved from URL <https://en.wikipedia.org/wiki/Singular_value_decomposition>, 17 pages.
Wikipedia.org [online], "Sparse Matrix" Oct. 2003, retrieved on Oct. 3, 2022, retrieved from URL <https://en.wikipedia.org/wiki/Sparse_matrix>, 10 pages.
International Preliminary Report on Patentability in International Appln. No. PCT/US2021/024274, mailed on Oct. 5, 2023, 10 pages.
Notice of Allowance in Japanese Appln. No. 2022-530961, mailed on Oct. 2, 2023, 5 pages (with English translation).
Office Action in European Appln. No. 21719466.1, mailed on Feb. 14, 2025, 7 pages.
Notice of Allowance in Korean Appln. No. 10-2022-7017118, mailed on Oct. 13, 2025, 3 pages (with English translation).
Office Action in European Appln. No. 21719466.1, mailed on Dec. 8, 2025, 8 pages.
Office Action in Chinese Appln. No. 202180006754.6, mailed on Dec. 23, 2025, 14 pages (with English translation).

* cited by examiner

100

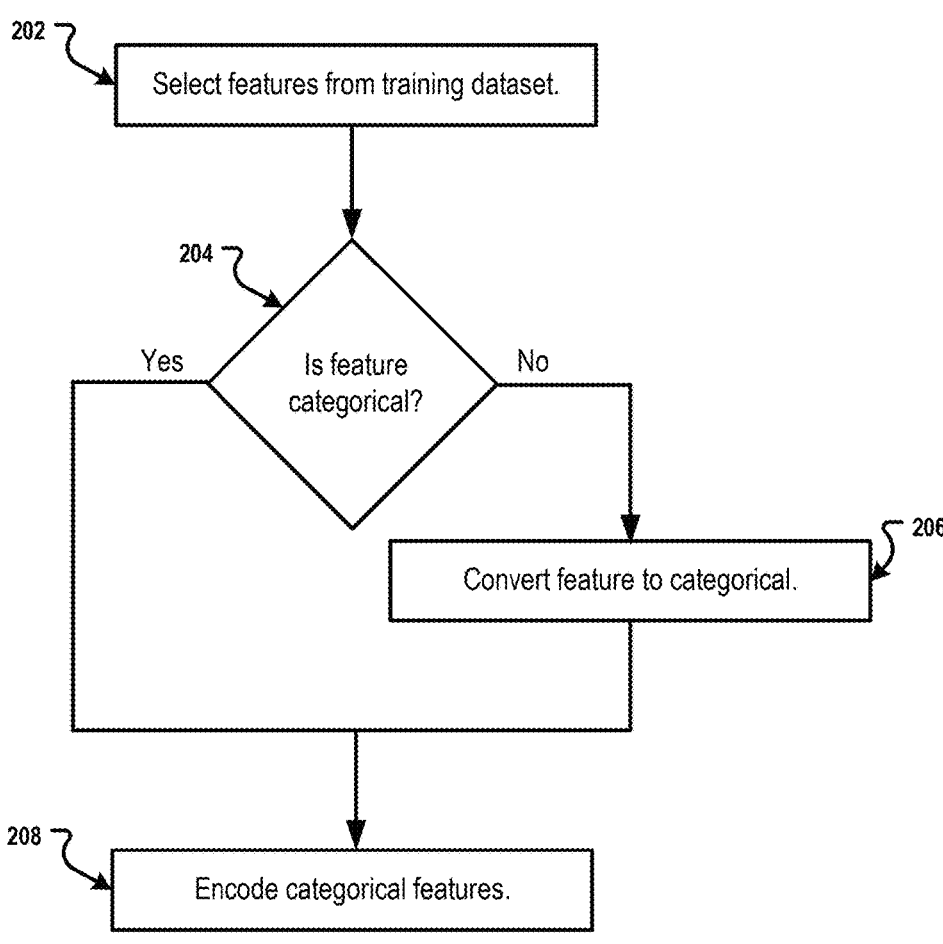
200
202
Select features from training dataset.
204
Is feature categorical?
Yes       No
206
Convert feature to categorical.
208
Encode categorical features.
FIG. 2

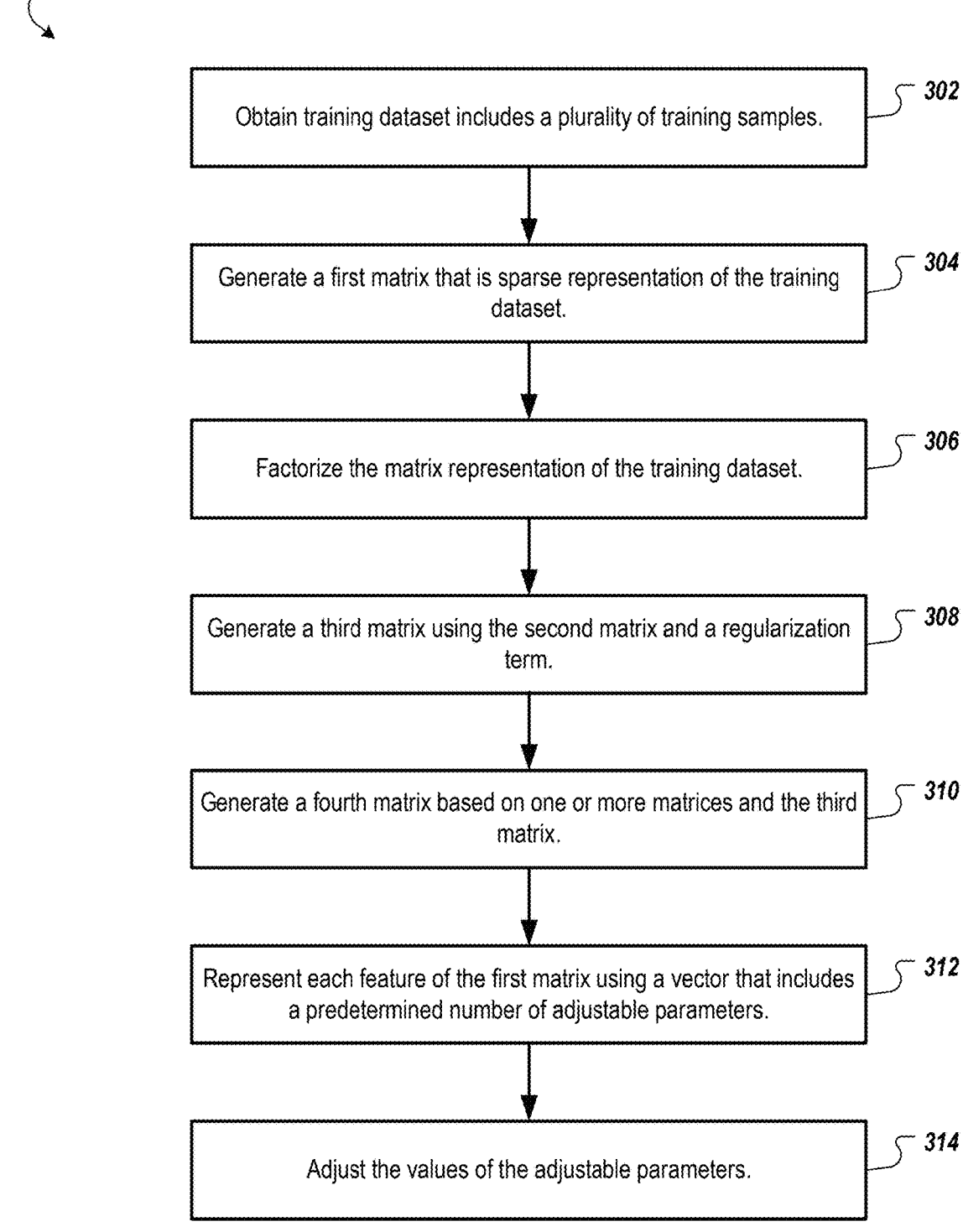

300

Obtain training dataset includes a plurality of training samples.    302

Generate a first matrix that is sparse representation of the training dataset.    304

Factorize the matrix representation of the training dataset.    306

Generate a third matrix using the second matrix and a regularization term.    308

Generate a fourth matrix based on one or more matrices and the third matrix.    310

Represent each feature of the first matrix using a vector that includes a predetermined number of adjustable parameters.    312

Adjust the values of the adjustable parameters.    314

Processor
410

Memory
420

Storage
Device
430

450

440

Input/Output

460

Input/Output
Devices

BOOSTING AND MATRIX FACTORIZATION

CROSS-REFERENCE TO RELATED APPLICATIONS

This application is a National Stage Application under 35 U.S.C. § 371 and claims the benefit of International Application No. PCT/US2021/024274, filed Mar. 26, 2021. The disclosures of the foregoing applications are incorporated herein by reference in their entirety.

BACKGROUND

This specification relates to processing data and machine learning models.

Machine learning is a type of artificial intelligence that aims to teach computers how to learn and act without necessarily being explicitly programmed. More specifically, machine learning is an approach to data analysis that involves building and adapting models, which allow computer executable programs to "learn" through experience. Machine learning involves design of algorithms that adapt their models to improve their ability to make predictions. This is done by first training a machine learning model using historical data (training data) for which the outcome (label) is known, which is called supervised learning. The computer may identify rules or relationships during the training period and learn the learning parameters of the machine learning model. Then, using new inputs, the machine learning model can generate a prediction based on the identified rules or relationships.

SUMMARY

In general, one innovative aspect of the subject matter described in this specification can be embodied in methods including the operations of obtaining, a training dataset including a plurality of training samples, wherein each training sample includes feature variables and one or more output variables: generating, using the training dataset, a first matrix that is a sparse representation of the training dataset wherein generating the first matrix includes: generating a categorical representation of the feature variables based on each numerical feature variable among the feature variables: generating an encoded representation of each categorical feature variable among the feature variables by encoding each categorical feature variable: factorizing the matrix representation of the training dataset to generate one or more matrices including a second matrix: generating a third matrix using (i) the second matrix and (ii) a regularization term: generating a fourth matrix based on (i) the one or more matrices and (ii) the third matrix: representing, each feature of the first matrix using a vector that includes a multiple adjustable parameters; and adjusting values of the adjustable parameters using a combination of (i) a loss function, (ii) the fourth matrix, and (iii) the first matrix.

Other implementations of this aspect include corresponding apparatus, systems, and computer programs, configured to perform the aspects of the methods, encoded on computer storage devices. These and other implementations can each optionally include one or more of the following features.

Methods can include a loss function that provides a result corresponding to a given result provided by a particular loss function of the form $$R_{k,i} = y_i - \left( \sum_{m=1}^{K} c_k + \sum_{m=1}^{K} e^{\sum_{j=1}^{M} E_{i,j,m}} \right)$$

where R is a residue, $y_i$ is the output variable, c is a constant and E is the encoded representation.

Methods can include generating a categorical representation of the feature variables based on each numerical feature variable that includes: selecting a set of knots; representing the numerical feature as either (i) a weighted sum of embedding, or (ii) a weighted average of the embedding: generating the corresponding weights of the embedding using an interpolation technique; and representing each numerical variable in the first matrix using the corresponding weights.

Methods can include interpolation techniques for generating the corresponding weights of the embedding comprises spline interpolation.

Methods can include generating a categorical representation of a set of ordinal features included in the training samples, including: performing a Discrete Fourier Transform (DFT) or Discrete Wavelet Transform (DWT) on the set of ordinal features; and assigning categorical representations to the set of ordinal features based, at least in part, on the DFT or DWT transformation matrix.

Methods can include adjusting values of the adjustable parameters that includes iteratively generating sequential models to predict a residue of the loss function until a residue of the loss function can no longer be reduced, a measure of model quality meets a quality threshold, or a size of the model has reached a maximum model size threshold.

Methods can include adjusting values of the adjustable parameters further can further include generating a pseudo residue based on the derivative of the loss function.

Methods can include training to predict a combined residual value of previously generated models in the sequence of models of each subsequently generated model.

Methods can further include adjusting values of the adjustable parameters that include adjusting the values of the adjustable parameters iteratively until a size of the model reached a model size threshold based, at least in part, on a memory constraint of a device training or invoking the model.

Particular embodiments of the subject matter described in this specification can be implemented so as to realize one or more of the following advantages. For example, the techniques discussed throughout this document can generate a trained machine learning model based on a new model architecture that requires less training and computational resources to train and yet provide high accuracy compared to other machine learning models that are both computationally expensive and require longer training periods. In general, a complex machine learning model can learn intricate relationships in the training data but makes it less favorable for devices with low computational power such as mobile phones, but this new architecture makes it feasible to learn or predict those intricate relationships using low computational power devices, making it more efficient than other machine learning models. The delay in inferencing from a complex model using other architectures also makes those other models less favorable for real time applications and critical systems in health and emergency, whereas the architecture discussed herein can be used for real time applications and critical systems in health and emergency. In fact, models generated using the techniques discussed herein can be many orders of magnitude smaller and faster than a typical neural network model.

The machine learning model described in this specification also has a higher degree of interpretability compared to other existing machine learning models that further makes it suitable for use in areas such as health where model prediction has to make sense to a human operator, thereby providing an improvement over other machine learning models. The machine learning model presented in this document can also be used in a broad range of modelling problems ranging from binary and multi-task classification, regression, and ranking making it favorable for a wide variety of modelling problems, thereby making the present machine learning model more flexible than other machine learning models that are limited in the types of modelling problems to which they can be applied.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for generating a first matrix.

FIG. 3 is a flow diagram of an example process of training the model parameters of the machine learning model.

DETAILED DESCRIPTION

This document discloses methods, systems, apparatus, and computer readable media on one or more computers in one or more locations that are configured to generate and provide a trained machine learning model in response to training a machine learning model on a set of training data.

As used in the specification and claims, the following terms have the following meanings, unless the context of use clearly specifies otherwise:

Features: A feature is an individual measurable property or characteristic of a phenomenon being observed.

Categorical Features: Features that are divided into groups. Generally these features take a limited number of possible values based on the groups to which they are assigned.

Numerical Features: Features that can be expressed in numbers, rather than natural language description. Sometimes called quantitative features, numerical features are collected in number form. Numerical features differentiates itself with other number form data types with its ability to carry out arithmetic operations with these numbers.

Ordinal Features: These features are a type of categorical data with a set order or scale to it.

Spline: A function made up of piecewise polynomials that each have a specific interval. The points where two of the piecewise polynomials meet is referred to as control points or knots.

Figure 1:
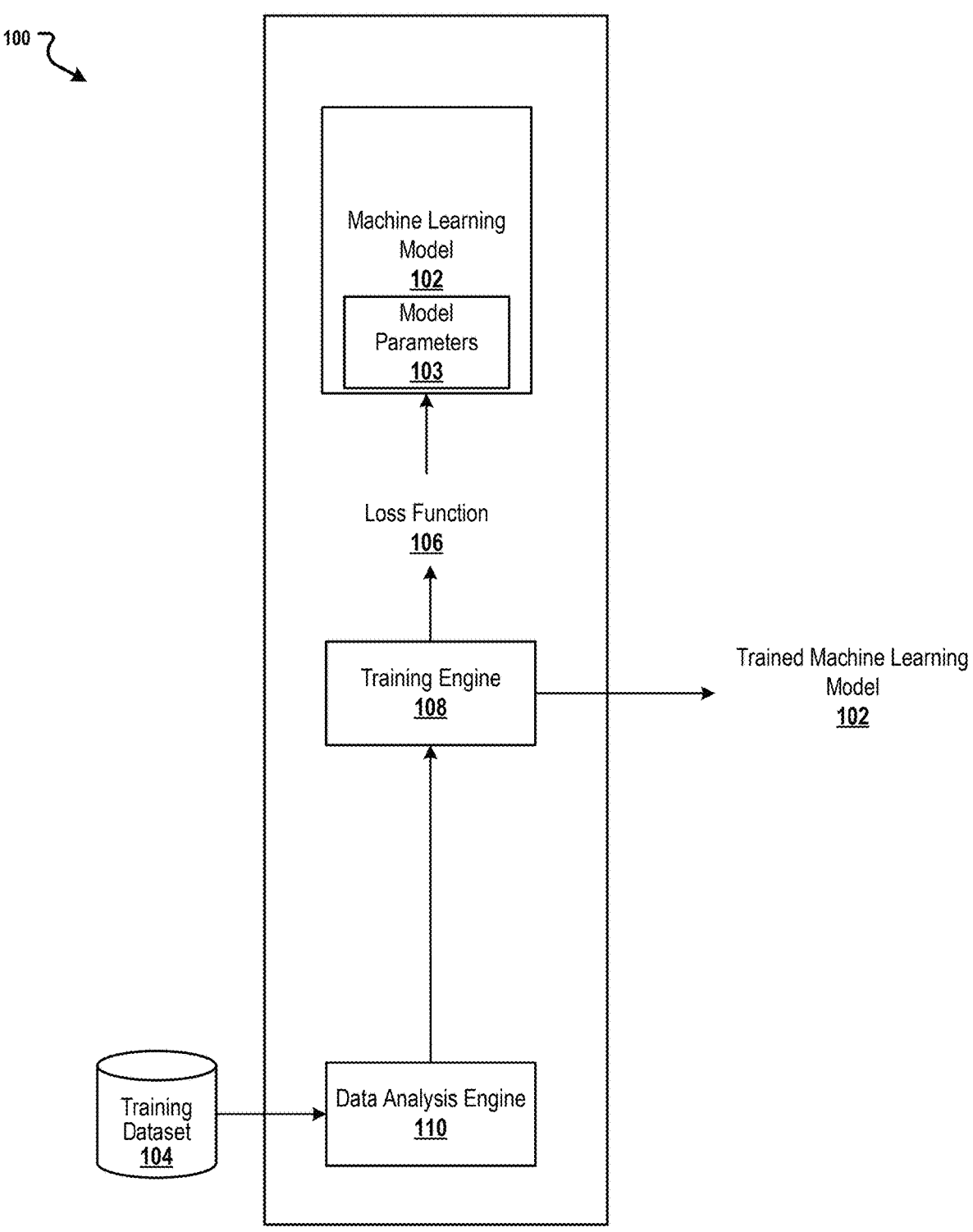
FIG. 1 is a block diagram of an example training system of a machine learning model.

FIG. 1 shows an example training system 100 of a machine learning model 102. The training system 100 is configured to generate and provide a trained machine learning model 102. The model 102 is configured to receive an input and to process the input in accordance with current values of a set of machine learning model parameters to generate an output based on the input. In general, the model 102 can be configured to receive any kind of data input, including but not limited to image, video, sound, and text data, and to generate any kind of score, prediction, classification, or regression output based on the input. The output data may be of the same type or modality as the input data, or different. Some applications of the model are described below: other applications include use in a machine-control system.

For example, when the model 102 is configured to process training examples that are images or features that have been extracted from images, the output generated by the model 102 for a given image may be scores for each of a set of object categories, with each score representing an estimated likelihood that the image depicts an object belonging to the category.

As for another example, if the model 102 is configured to process training examples that are Internet resources (e.g., web pages), documents, or portions of documents or features extracted from Internet resources, documents, or portions of documents, the output generated by the model 102 for a given Internet resource, document, or portion of a document may be a score for each of a set of topics, with each score representing an estimated likelihood that the Internet resource, document, or document portion is about the topic.

As for another example if the model 102 is configured to process training examples that are features of an impression context for a particular digital component (e.g., audio, video, text, or other information, including information in the form of an advertisement), the output generated by the model 102 may be a score that represents an estimated likelihood that the particular digital component will be clicked on.

As for another example, if the model 102 is configured to process training examples that are features of a personalized recommendation for a user, e.g., features characterizing the context for the recommendation, e.g., features characterizing previous actions taken by the user, the output generated by the model 102 may be a score for each of a set of recommendations, with each score representing an estimated likelihood that the user will respond favorably to being provided the recommendation.

As for another example, if the model 102 is configured to process training examples that are sequences of text in one language, the output generated by the model 102 may be a score for each sequence of text among a set of sequences of text in another language, with each score representing an estimated likelihood that the sequence of text in the other language is a proper translation of the input text into the other language.

As for another example, if the model 102 is configured to process training examples that are sequences representing spoken utterances, the output generated by the model 102 may be a score for each piece of text among a set of pieces of text, with each score representing an estimated likelihood that the piece of text is the correct transcript for the utterance.

The training dataset 104 includes multiple training examples. Each training example includes one or more features and a corresponding target output. The target output corresponding to a training example refers to a preferred, or goal, output of the model 102 in response to processing the one or more features of the training examples.

In some implementations, rather than specifying training inputs and corresponding target outputs, the training examples specify sequences of "experience tuples" that characterize the interaction of an agent with an environment over multiple time steps. Each experience tuple includes: (i) an observation characterizing a state of an environment at a respective time step, (ii) an action performed by the agent at the respective time step, (iii) a subsequent observation characterizing a subsequent state of the environment at a next time step, and (iv) a reward received as a result of the agent performing the action at the time step.

The system 100 can receive the training dataset 104 in any of a variety of ways. For example, the system 100 can receive the training dataset 104 as an upload from a remote user of the system over a data communication network, e.g., using an application programming interface (API) made available by the system 100.

The system 100 can include a data analysis engine 110. In some implementations, the data analysis engine 110 can implement techniques and methods for creating or processing the one or more features of the training examples of the training dataset 104 to create and/or select features to increase the predictive power of the learning algorithm. In general, training data for a machine learning model must be presented in a format that allows a model to be built. Whether it is structured (numerical/categorical/nominal) data or unstructured (text, audio, images, video), the model generally accepts a tabular format where training examples form the rows and the features form the columns. However, other formats are possible. For the purpose of explanation, the training dataset 104 can be defined as having N training examples of the form $\{x_i, y_i\}, \ldots \{x_N, y_N\}$ where $x_i$ is a feature vector of the i-th training example and $y_i$ is the target output. Since the dimension of the feature vector $x_i$ is fixed, the training dataset can be represented using a table or a matrix.

The use of embeddings is natural for categorical features, but the use of embeddings for numerical features requires a conversion of often continuous values of numerical features to discrete points in feature space. In some implementations, such discrete points are referred to as control points or knots. In some implementations, the data analysis engine 110 processes the value of each numerical feature among the one or more features of the training dataset 104 into discrete points using cubic spline interpolation. Cubic spline interpolation can construct new points within the boundaries of a set of known points. These new points are function values of an interpolation function (referred to as spline), which itself consists of multiple cubic piecewise polynomials.

For the purpose of explanation, consider a training dataset 104 that includes n training examples of one numerical feature x and a target output y. In some implementations, the data analysis engine 110 can quantile legitimate feature value x using any number of knots (for e.g., n+1 knots) such that $\{(x_i, Y_i): i=1, \ldots n\}$ where $Y_i$ is a K-dimensional embedding representation for $x_i$ and $x_0 < x_1 < \ldots < x_n$.

In some implementations, for a value of a numerical feature $x_{k+1}+t$ where $0 \le t < x_{(k+2)} - x_{k+1}$, the value of the numerical feature can be represented by an embedding Y (i.e. a vector in an embedding space) that can be determined by a weighted sum of $\{Y_k, Y_{k+1}, Y_{k+2}, Y_{k+3}\}$ and $\{w_k, w_{k+1}, w_{k+2}, w_{k+3}\}$. In some implementations, the embedding Y can take the following form $$Y = w_k * Y_k + w_{k+1} * Y_{k+1} + w_{k+2} * Y_{k+2} + w_{k+3} * Y_{k+3} \qquad 1$$

In some implementations, the weights $\{w_k, w_{k+1}, w_{k+2}, w_{k+3}\}$ can be computed using the following equations

6

$$w_k = h_{10}(t) * \frac{-1}{2*(x_{k+1} - x_k)} \qquad 2$$

$$w_{k+1} = h_{00}(t) + h_{10}(t) * \left( \frac{-1}{2*(x_{k+2} - x_{k+1})} + \frac{1}{2*(x_{k+1} - x_k)} \right) + h_{11}(t) * \frac{-1}{2*(x_{k+2} - x_{k+1})} \qquad 3$$

$$w_{k+2} = h_{01}(t) + h_{10}(t) * \frac{1}{2*(x_{k+2} - x_{k+1})} + h_{11}(t) * \left( \frac{-1}{2*(x_{k+3} - x_{k+2})} + \frac{1}{2*(x_{k+2} - x_{k+1})} \right) \qquad 4$$

$$w_{k+3} = h_{11}(t) * \frac{1}{2*(x_{k+3} - x_{k+2})} \qquad 5$$

where $h_{00}(t)$, $h_{10}(t)$, $h_{01}(t)$, $h_{11}(t)$ are hermite basis function representing a cubic hermite spline interpolating between an interval $[x_{k+1}, x_{k+2}]$ that can be determined using the following equations $$Y = h_{00}(t) * Y_{k+1} + h_{10}(t) * m_{k+1} + h_{01}(t) * Y_{k+2} + h_{11}(t) * m_{k+2} \qquad 6$$

$$h_{00}(t) = 2 * t^3 - 3 * t^2 + 1 \qquad 7$$

$$h_{10}(t) = t^3 - 2 * t^2 + t \qquad 11$$

$$h_{01}(t) = -2 * t^3 + 3 * t^2$$

$$h_{11}(t) = t^3 - t^2$$

$$m_{k+1} = \frac{1}{2} * \left( \frac{Y_{k+2} - Y_{k+1}}{x_{k+2} - x_{k+1}} + \frac{Y_{k+1} - Y_k}{x_{k+1} - x_k} \right)$$

$$m_{k+2} = \frac{1}{2} * \left( \frac{Y_{k+3} - Y_{k+2}}{x_{k+3} - x_{k+2}} + \frac{Y_{k+2} - Y_{k+1}}{x_{k+2} - x_{k+1}} \right) \qquad 12$$

In some implementations, when the value of a numerical feature $x_i$ is within the interval $[x_{k+1}, x_{k+2}]$, the data analysis engine 110 can use the weights $w_k$, $w_{k+1}$, $w_{k+2}$, $w_{k+3}$ to represent the embedding of the numerical feature as a weighted sum of 4 embeddings for 4 values chosen independently from $x_i$. Those 4 values can be $x_k$, $x_{k+1}$, $x_{k+2}$ and $x_{k+3}$. Those 4 points are examples of control points or knots.

In some implementations, when the value of a numerical feature $x_i$ is within the interval $[x_0, x_1]$, the data analysis engine 110 can use equations 13 and 14 in addition to the equations 6-12 mentioned above to calculate weights $w_0$, $w_1$ and $w_2$ to represent the numerical feature $x_i$.

$$m_{k+1} = \frac{Y_{k+2} - Y_{k+1}}{x_{k+2} - x_{k+1}} \qquad 13$$

$$m_0 = (Y_1 - Y_0) / (x_1 - x_0) \qquad 14$$

When using equations 13 and 14, the equations 2, 3 and 4 can take the following form respectively $$w_0 = h_{00}(t) + h_{10}(t) * \left( \frac{-1}{x_1 - x_0} \right) + h_{11}(t) * \frac{-1}{2*(x_1 - x_0)} \qquad 15$$

$$w_1 = h_{01}(t) + h_{10}(t) * \left( \frac{1}{2*(x_1 - x_0)} \right) + h_{11}(t) * \left( \frac{-1}{2*(x_2 - x_1)} + \frac{1}{2*(x_1 - x_0)} \right) \qquad 16$$

$$w_2 = h_{11}(t) * \frac{1}{2*(x_2 - x_1)} \qquad 17$$

In some implementations, if the value of a numerical feature $x_i$ is within the interval $[x_{n-1}, x_n]$, the data analysis engine 110 can use the equations 18 and 19 in addition to the equations 6-12 mentioned above to calculate weights $w_{n-2}$, $w_{n-1}$ and $w_n$ to represent the numerical feature $x_i$.

$$m_{k+2} = \frac{Y_{k+2} - Y_{k+1}}{x_{k+2} - x_{k+1}} \qquad 19$$

$$m_n = \frac{Y_n - Y_{n-1}}{x_n - x_{n-1}}$$

When using equations 18 and 19, the equations 2, 3 and 4 can take the following form respectively $$w_{n-2} = h_{10}(t) * \frac{-1}{2*(x_{n-1} - x_{n-2})} \qquad 20$$

$$w_{n-1} = h_{00}(t) + \qquad 21$$
$$h_{10}(t) * \left( \frac{-1}{2*(x_n - x_{n-1})} + \frac{1}{2*(x_{n-1} - x_{n-2})} \right) + h_{11}(t) * \frac{-1}{2*(x_n - x_{n-1})}$$

$$w_n = h_{01}(t) + h_{10}(t) * \frac{1}{2*(x_n - x_{n-1})} + h_{11}(t) * \left( \frac{1}{x_n - x_{n-1}} \right) \qquad 22$$

In some implementations, the data analysis engine 110 can further optimize (e.g., improve or otherwise adjust) the number and location of knots. For example, assume that $x_{i,j}$ is the value of the j-th numerical feature of the i-th training example. Further assume that the observed value for the j-th feature ranges from $[\min(x_{i,j}), \max(x_{i,j})]$. If $x_{i,j}$ is evenly distributed within the range $[\min(x_{i,j}), \max(x_{i,j})]$, the data analysis engine 110 can choose knots with equal distances with the range. If $x_{i,j}$ is not distributed evenly within the range, the data analysis engine 110 can choose knots based on the density of the value $x_{i,j}$. For example, the data analysis engine 110 can select knots based on the quantile of the $x_{i,j}$ distribution which allows for an equal probability for any $x_{i,j}$ to fall between adjacent pairs of knots thereby providing sufficient support to lean the embedding.

In some implementations, the data analysis engine 110 can optimize the selection of knots using Hadamard Transform (HT) which is a generalization of Fourier Transform (FT). In other implementations, the data analysis engine 110 can also use Haar Wavelet Transform (HWT) instead of HT. However, explaining the appropriate methods and techniques of how HT and HWT can be used is informed by an understanding of the working of the machine learning model 102. For the purpose of explanation, the following section of the document will present the methods and techniques of training the machine learning model 102.

FIG. 2 is a flow diagram of an example process 200 for generating a first matrix. To support the formulation of the training process, the first matrix is referred to as A. Operations of the process 200 can be implemented for example by the data analysis engine 110. Operations of the process 200 can also be implemented as instructions stored on one or more computer readable media which may be non-transitory, and execution of the instructions by one or more data processing apparatus can cause the one or more data processing apparatus to perform the operations of the process 200. The training dataset 104 is represented using a tabular format that includes rows and columns where each row is a training example and each column is a feature of the training example. Of course, other appropriate formats could be used.

In some implementations, the first matrix is a sparse matrix generated by encoding the categorical features of the training dataset 104 using encoding techniques such as one-hot encoding. However, since the training dataset 104 can include other types of features (for e.g., numerical and ordinal), the data analysis engine can process the numerical and ordinal features and convert them to categorical features according to the methods described above.

The data analysis engine 110 selects features from the training dataset (202). For example, the data analysis engine 110 can iteratively select a feature from among the one or more features of the training dataset 104 for processing. In other implementations, the data analysis engine 110 can simultaneously select multiple features from the one or more features from the training dataset 104 for processing since the processing of each feature is independent of the processing of the other features thereby consuming less computational time.

The data analysis engine 110 can determine if the selected feature is a categorical feature (204). For example, the data analysis engine 110 can implement methods known in the art to determine if the selected feature from the training dataset 104 is a categorical feature. If a feature is determined to be categorical, the data analysis engine 110 can go to step 208 of the process 200. If the feature is determined to be not categorical, the data analysis engine 110 can use step 206 of the process 200 to convert the feature into categorical feature.

The data analysis engine 110 can convert the value of non-categorical features into discrete points in feature space (206). For example, the data analysis engine 110 after determining that a particular feature is not categorical (i.e., the particular feature is numerical), can use cubic spline interpolation method (described above) to convert the value of the particular feature into a weighted average based on the knots. For example, the numerical feature $x_i$ can be represented using a k-dimensional embedding $Y_i$.

The data analysis engine 110 can generate an encoded representation of the features (208). For example, the data analysis engine 110 can use methods such as one-hot encoding to generate an encoded representation of the categorical features. In general, one-hot encoding converts categorical features into a vector of ones and zeros depending upon the category of the particular feature. For example, if a particular feature that identifies gender takes values Male and Female, the one-hot encoded representation can have two features such that the first feature of the representation will have a value of one (and the second feature will have a value zero) if the particular feature is a Male. Correspondingly, if the particular feature is female, first feature of the representation will have a value of zero (and the second feature will have a value one).

Note that prior to the step 208 of the process 200, all features in the training dataset are categorical since the features that are not categorical, were processed in the step 206 to generate a categorical representation. It should also be noted that even though the step 208 has been described as using one-hot encoding technique to generate an encoded representation of the categorical features, any appropriate encoding technique can be used for the purpose.

In some implementations, after generating a first matrix, the data analysis engine 110 can use singular value decomposition (SVD) to decompose the first matrix into one or more matrices. The SVD method can be represented using the following equation $$A = U * \Sigma * V^T \qquad 23$$

Where A is an n×m matrix such that n>m, U is a n×m orthogonal matrix, $\Sigma$ is a m×m diagonal matrix (also referred to as the second matrix) and V is a m×m orthogonal matrix.

In some implementations, the data analysis engine 110 can compute a third matrix $\Sigma^{-1}$ i.e. the inverse of the matrix $\Sigma$ using a regularization term $\lambda$. $\Sigma^{-1}$ can be calculated using the following equation $$\sum{}^{-1} = \mathrm{diag}\left(\frac{\sigma_1}{\sigma_1^2 + \lambda}, \, \cdots \, \frac{\sigma_r}{\sigma_r^2 + \lambda}\right) \qquad 24$$

where $\Sigma = \mathrm{diag}(\sigma_1, \ldots \sigma_r)$ and $\sigma_1, \ldots \sigma_r$ are singular values.

In some implementations, equation 24 can be used to compute the inverse of the first matrix (also referred to as a fourth matrix) using equation 25

$$A^{-1} = V * \sum{}^{-1} * U^T = V * \mathrm{diag}\left(\frac{\sigma_1}{\sigma_1^2 + \lambda}, \, \cdots \frac{\sigma_r}{\sigma_r^2 + \lambda}\right) * U^T \qquad 25$$

In some implementations, the system 100 can further include a training engine 108 that can include one or more processors and is configured to, at each iteration, train the model 102 based on the loss function 106. In some implementations, the training engine 108 can train the model 102 by adjusting the values of the model parameters 103 from current values of the model parameters 103 in order to decrease a loss value generated by the loss function 106.

In some implementations, the data analysis engine 110 can map each feature of the training dataset 104 to an embedding representation of a dimension K that is determined based on the unique values and/or levels (also referred to as cardinality of a feature) of the feature. For example, if the training dataset 104 has N training examples and each training example has M features, then the value of the j-th feature of the i-th training example can be represented using an embedding $E_{i,j}$ of dimension K where $E_{i,j} \epsilon R^K$. It should be noted that for each distinct value of a categorical feature $x_j$, there is a distinct embedding $E_j$ resulting in $|x_j|$ distinct embedding for the feature j where $|x_j|$ is the cardinality of the categorical feature j.

In some implementations, during training the machine learning model 102, the machine learning model can predict according to the following equation $$C + \sum_{k=1}^{K} e^{\sum_{j=1}^{M} E_{i,j,k}} \qquad 26$$

where C can be a constant that can be defined as $$C = \sum_{k=1}^{K} c_k \qquad 27$$

The training engine 108 can train the machine learning model using K iterations by adjusting the values of the trainable parameters $c_k$ and the embedding representation. For example, during a k-th iteration of the training process, the training engine can calculate the trainable parameters $c_k$ and the k-th value of each of the $|x_j|$ embedding representation for all features.

In general, a residue for a machine learning model is the difference between the model prediction and the target output. According to the machine learning model 102, the residue for a k-th iteration of the training process can be computed using equations 26 and 27. The residue can be represented in the following form where $y_i$ is the target output for a sample i.

$$R_{k,i} = y_i - \left(\sum_{m=1}^{K} c_k + \sum_{m=1}^{K} e^{\sum_{j=1}^{M} E_{i,j,m}}\right) \qquad 28$$

In some implementations, the target output for each subsequent training iteration can be the residue from the previous iteration(s). For example, the target output $y_i$ during the k-th is the residual $R_{k-1,i}$ calculated using equation 28 in the k−1-th training iteration which logically means that each training iteration tries to learn model parameters based on the residual (also referred to as a prediction error) of the previous training iteration. This training process can generate an overdetermined system of N equation that can be represented as $$c_k + e^{\sum_{j=1}^{M} E_{i,j,k}} = R_{k-1,i} \qquad 29$$

where i=1, 2, . . . N.

In some implementations, the overdetermined system of N equations can be transformed into logarithmic space, for example, by moving $c_k$ to the right side of equation 29, and taking the log of both sides of the resulting equation, as represented by equation 30

$$\sum_{j=1}^{M} E_{i,j,k} = \log(R_{k-1,i} - c_k) \qquad 30$$

where $R_{k-1,i} - c_k > 0$ for any $1 \le i \le N$.

It should be noted that $$\sum_{j=1}^{M} E_{i,j,k} = A * X$$

where X is the K-th value of each of the $[x_j]$ embedding representation for all features concatenated together corresponding to the columns of the first matrix. Using equation 30, the overdetermined system of N equations can further represented as $$A * X = B \qquad 31$$

where $B_i = \log(R_{k-1,i} - c_k)$.

It should be noted that equation 31 can be similar to the formulation of a classical linear regression problem without the intercept in the formulation. In some implementations, equation 31 can be modified into $[A\ 1]*[X\ b]^T = B$ by adding an extra column in the first matrix A. In some implementations, adding an extra column in the first matrix A can be achieved by adding a categorical feature with a single value to each of the training examples of the training dataset 104.

In some implementations, the training engine 108 can calculate X in equation 31 of the overdetermined system.

Since $A*X=B$ and $A=U*\Sigma*V^T$ the following equation can be derived $$U*\Sigma*V^T*X=B \tag{32}$$

which leads to $$V*\Sigma^{-1}*U^T*U*E*V^T*X=V*\Sigma^{-1}*U^T*B \tag{33}$$

Since matrices $U*U^T=I$, $V*V^T=I$ and $\Sigma*\Sigma^T=I$, equation 33 can be used to derive X as follows $$X=V*\Sigma^{-1}*U^T*B=A^{-1}*B \tag{34}$$

where $A^{-1}$ is computed using equation 25 and $B_i=\log\log(R_{k-1,i}-c_k)$.

In some implementations, the training engine 108 can select the value of $c_k$ based on the heuristics described below.

If $\min(R_{k-1,i})-c_k>1$ and $\log(\max(R_{k-1,i})-c_k)>\log(\min(R_{k-1,i})-c_k)>0$ the value of $c_k$ can be increased to reduce $\log(\max(R_{k-1,i})-c_k)$ and $\max((\log(R_{k-1,i}-c_k))^2)$.

If $\max(R_{k-1,i})-c_k<1$ and $0>\log(\max(R_{k-1,i})-c_k)>\log(\min(R_{k-1,i})-c_k)$ the value of $c_k$ can be decreased to reduce $\max((\log(R_{k-1,i}-c_k))^2)$.

The value of $\max((\log(R_{k-1,i}-c_k))^2)$ can reduced to minimum when $$\frac{1}{\min(R_{k-1,i})-c_k}=\min(R_{k-1,i})-c_k \text{ such that}$$

$$c_k=\frac{(\min(R_{k-1,j})+\max(R_{k-1,j}))-\sqrt{(\min(R_{k-1,j})-\max(R_{k-1,j}))^2+4}}{2}$$

In some implementations, the training engine 108 can further optimize the selection of $c_k$ based on the intuition that by selecting an optimal value for $c_k$, the value of $|A*X-B|^2$ can be minimized. This can be represented using the function $L(c_k)$ where $$L(c_k)=B^T*(1-A*(A^T*A)^{-1}*A^T)*B \tag{35}$$

By calculating $C=1-A*(A^T*A)^{-1}*A^T$, equation 35 can take the form $$L(c_k)=B^T*C*B=\Sigma_i\Sigma_jC_{i,j}*\log(R_{k-1,i}-c_k)*\log(R_{k-1,j}-c_k) \tag{36}$$

In some implementations, the training engine 108 can use gradient descent algorithm which is a first-order iterative optimization algorithm to find the value of $c_k$ that minimizes $L(c_k)$. The gradient descent algorithm uses the first derivative of the function $L(c_k)$. The first order derivative of the function takes the following form $$L'(c_k)=-\sum_i\sum_j C_{i,j}*\left(\frac{\log(R_{k-1,i}-c_k)}{R_{k-1,j}-c_k}*\frac{\log(R_{k-1,j}-c_k)}{R_{k-1,i}-c_k}\right)$$

In some implementations, the training engine 108 can use newton method or stochastic newton method which are second-order iterative optimization algorithms to find the value of $c_k$ that minimizes $L(c_k)$. The newton method and stochastic newton method uses the second derivative of the function $L(c_k)$. The second order derivative of the function takes the following form $$L''(c_k)=\sum_i\sum_j C_{i,j}*$$

$$\left(\frac{2}{(R_{k-1,i}-c_k)(R_{k-1,j}-c_k)}-\frac{\log(R_{k-1,i}-c_k)}{(R_{k-1,j}-c_k)^2}*\frac{\log(R_{k-1,j}-c_k)}{(R_{k-1,i}-c_k)^2}\right) \tag{38}$$

This technique for optimizing the value of cx can differ from the use of a neural net for example, because here, each iteration only has a single unknown, $c_k$, making this a single variable optimization problem, whereas a neural network optimization problem can require the processing of millions or billions of variables, and having to find local minimums for hundreds or millions of variables. As such, it is easy to see that this technique for optimizing $c_k$ provides significant resource and training time reductions relative to neural network optimizations.

In some implementations, the training engine 108 can directly optimize the cost function using stochastic gradient descent (SGD) algorithm. The cost function of the machine learning model can have the following form $$\sum_i\left(C+\sum_{k=1}^{K}e^{\sum_{j=1}^{M}E_{i,j,k}}-y_i\right)^2 \tag{39}$$

In some implementations, the training engine 108 can use coordinate descent algorithm to optimize the trainable parameters. In such an implementation, the coordinate descent algorithm can calculate a new value of C where the new value C' can be calculated using $$C'=\frac{1}{N}*\sum_i^N\left(y_i-e^{\sum_{j=1}^{M}E_{i,j,k}}\right) \tag{40}$$

In some implementations, the training engine 108 can calculate the embedding representation of a value for a particular feature using an overdetermined system. For example, an overdetermined system $A*X=B$, can be solved for X using QR decomposition. In such a case, the solution X is a K dimensional vector and $\log(\max(x_k, \in))$ is the new value for the k-th element in the embedding and $\in$ is a small positive number. Such an overdetermined system can be represented as follows $$A_{p_i,k}=e^{\left(\sum_{j=1}^{M}E_{i,j,k}\right)-E_{i,q,k}}$$

$$B_{p_i,k}=y_i-C$$

where $x_{i,q}=v$ and $p_i, \ldots=\{0, 1, 2, \ldots\}$

In some implementations, the termination criteria of the training process of the machine learning model 102 can be determined based on the residual after the k-th iteration of the training process. For example, if the iterative optimization methods described above are not able to further minimize the magnitude of the residual, the training process can be terminated and current values of the model parameters including the dimension K, the constant C and all the embedding representations for all features can be considered as final values.

In some implementations, the termination criteria for the training process can be the machine learning prediction accuracy that can be measured using metrics such as precision, recall, F1 score or PR AUC. For example, the training engine 108 can terminate the training process when the accuracy of the machine learning model 102 with the current model parameters reached a predetermined threshold.

Coming back to the selection of knots using HT and HWT. For each one of the K dimensions, the data analysis engine 110 and the training engine 108 learns a function $f'$ that maps a feature value $x_{i,j}$ that falls within the range $[\min(x_{i,j}), \max(x_{i,j})]$ into a floating point number. Let's assume that $f$ represents the actual unknown smooth function to be learned. For equally spaced knots $x_0 < x_1 < \ldots < x_n$ where $x_0 = \min(x_{i,j})$ and $x_n = \max(x_{i,j})$, the methods described above learns cubic spline $f'$ that is sufficiently close to $f$. To evaluate the closeness, we evaluate both $f$ and $f'$ at any $x_i$ where $x_0 < x_i < x_n$ where $|f(x_i) - f'(x_i)| < \epsilon$ for a well-trained model. To represent the cubic spline with m+1 knots, the model needs m+1 parameters to be learned, i.e. $\{f'(x_0), f'(x_1), \ldots f'(x_m)\}$. If the value of m chosen is significantly larger than necessary, there may be many redundancies in the model parameters $\{f'(x_0), f'(x_1), \ldots f'(x_m)\}$. We may be able to compress the model parameters $\{f'(x_0), f'(x_1), \ldots f'(x_m)\}$, i.e. reduce the model size without reducing the quality of the cubic spline fitness. If we consider $\{f'(x_0), f'(x_1), \ldots f'(x_m)\}$ as a one-dimensional continuous signal sampled at m+1 points, we may convert the one-dimensional signal into frequency domain using either Hadamard Transform (HT) which is a generalization of Fourier Transform (FT), or Haar Wavelet Transform (HWT) which is one possible wavelet transformation. Continuous one-dimensional signals can often be compressed better in the frequency domain.

In some implementations, the data analysis engine 110 can transform function $f$ into the frequency domain (denoted as F) using Hadamard transformation. The transformation matrix for the Hadamard transformation can take the following form $$(H_n)_{i,j} = 2^{-\frac{n}{2}} * (-1)^{i \cdot j} \qquad 42$$

where i·j is a bitwise dot product of the binary representations of the numbers i and j. Since transforming $f$ to F is equivalent to projecting vector $\{f'(x), f'(x_1), \ldots f'(x_m)\}$, the following relationship holds $$H_n * \{f'(x_0), f'(x_1), \ldots f'(x_m)\}^T = \{F(x_0), F(x_1), \ldots F(x_m)\} \qquad 43$$

where $m = 2^n$.

In some implementations, the training engine 108 can train the machine learning model 102 in the frequency domain. For example, equations 6-12 and 44 can be used to conclude that each Y is a linear combination of all $F'(x_0)$, $F'(x_1), \ldots F'(x_m)$. The training engine 108 can then construct the first matrix and calculate the values of $F'(x_0)$, $F'(x_1), \ldots F'(x_m)$ directly using equations 31-38.

$$\{f'(x_0), f'(x_1), \ldots f'(x_m)\}^T = H_n^{-1} * \{F'(x_0), F'(x_1), \ldots F'(x_m)\}^T \qquad 44$$

When training the machine learning model 102 in the frequency domain, each element in the learned embedding is a coefficient of (i.e. the weights in linear combination of) frequencies in frequency domains. For elements whose values are really small, the training engine 108 can set those element values to 0 to reduce the number of model parameters, model capacity, as well as to avoid overfitting. Compression in the frequency domain may be more efficient.

In some implementations, the application of regularization, e.g. equation 24, can shrink the element values in the learned embedding toward 0. For elements whose values are really small, the training engine 108 can set those element values to 0 to reduce the number of model parameters, model capacity, as well as to avoid overfitting.

In some implementations, the data analysis engine 110 can use the hadamard transformation method (explained above) if the features in the training dataset 104 includes ordinal features. In such an implementation, the number of distinct values of the ordinal features can be padded to increase the number of distinct values to $2^{ceiling(log_2(m))}$, where ceiling(x) returns the smallest integer that is not smaller than x.

In general, machine learning models can be used for a variety of tasks such as regression, classification and ranking. The following section describes how the machine learning model 102 described above can be used for such tasks.

Multiclass Classification

Assume that there is a training dataset 102 of N training examples of the form $\{x_i, 1_i\}, \ldots \{x_N, 1_N\}$ where $x_i$ is a feature vector of the i-th training example and $1_i$ is the corresponding target label where $1_i$ is an instance of all possible labels L i.e. $1_i \in L$. Further assuming that the number of features for each training example is M-1 i.e. $x_{i,1}, \ldots x_{i,M-1}$.

The multiclass classification problem is to find a classifier F to predict the class label for a training example, i.e. $F(x_{1,1}, \ldots x_{i,M-1}) = 1_i$. The multiclass classification problem can be reformulated into a regression problem for each class i.e. to find a classifier F' such that $F'(x_{1,1}, \ldots x_{i,M}) = 1$ if $x_{i,M} = 1_i$ and 0 otherwise for all $x_{i,M} \in L$.

During the training process, the data analysis engine 110 can convert N training examples of the training dataset 102 into N*L training examples, where N training examples have a target label 1 and N*(L-1) training examples have a label 0. In case the classification problem suffers from unbalanced datasets, weights can be assigned to the training examples. For example, a hyperparameter $\delta > 0$ can be defined and the generated training examples and labels can be modified as follows. For all $x_{i,M} \in L$, $$\delta * (L-1) * F(x_{1,1}, \ldots x_{i,M-1}, x_{i,M}) = \delta * (L-1) \text{ if } x_{i,M} = 1_i$$

$$F(x_{i,1}, \ldots x_{i,M-1}, x_{i,M}) = 0 \text{ otherwise} \qquad 45$$

where the weight for the training examples with 1 as the label is $\delta * (L-1)$. It should be noted that selecting $\delta = 1$ will result in a perfectly balanced binary classification problem. It should also be noted that increasing the value of $\delta$ reduces intra-class variance in the prediction result of F'.

The optimal classifier F' can then be calculated using equation 26 and the corresponding solution described in the document. It should be noted that each label $1_i \in L$ will have a K-dimensional embedding during training. To predict the most likely labels, equation 26 can be reformatted into a dot product of two vectors of dimension K+1 where the labels with the largest dot product have the highest likelihood of being the label for the training example $x_{i,1}, \ldots x_{i,M-1}$.

The first of the two vectors (presented below) can be independent of the possible labels and only related to the values of the features for the i-th training example $x_{i,1}, \ldots x_{i,M-1}$ $$\{C, p_1, \ldots, p_K\} \text{ where } p_K = e^{\sum_{j=1}^{M-1} E_{i,j,k}} \qquad 46$$

The second of the two vectors (presented below) can be the embedding of the label and independent of the values of the features for the i-th training example $x_{i,1}, \ldots x_{i,M-1}$ $$\{1, q_1, \ldots, q_K\} \text{ where } q_K = e^{E_{i,M,k}} \qquad 47$$

Multi-Task Classification/Regression

Assume that there is a training dataset 102 of N training examples where each training example has features $x_{i,1}, \ldots x_{i,M-1}$ and labels $l_{i,t_1}, \ldots x_{i,t_T}$ where $\{t_1, \ldots t_T\}$ are tasks.

During the training process, the data analysis engine 110 can convert multi-task problem into an equivalent single-task problem by defining a dummy categorical feature vector $X_m$ with values $\{t_1, \ldots t_T\}$. The i-th training example can further be expanded to T training examples as follows $$F(x_{i,1}, \ldots x_{i,M-1}, t_1) = l_{i,t_1},$$

$$F(x_{i,1}, \ldots x_{i,M-1}, t_2) = l_{i,t_2},$$

$$F(x_{i,1}, \ldots x_{i,M-1}, t_r) = l_{i,t_r}. \qquad 48$$

The training engine 108 can then train the function F according to the techniques and methods described above, to learn a K-dimensional embedding$_t$ for each task t which is similar to the multiclass classification problem (described above) where each label has an embedding.

Similar to the multiclass classification problem, the training engine 108 can calculate the vector $\{p_1, \ldots p_K\}$ where $$p_k = e^{\sum_{j=1}^{M-1} E_{i,j,k}} \qquad 25$$

is independent of the possible tasks and is only related to the values of the features of the i-th training example $x_{i,1}, \ldots x_{i,M-1}$. The predicted result of task t can then be computed using $$C + \{p_1, \ldots p_K\} \odot \text{embedding}_t \qquad 49$$

Ranking

In general, learning-to-rank problem can be formulated as a set of item-neutral contextual features $\{X_1, \ldots X_M\}$ and a set of item-specific features $\{Y_1, \ldots Y_N\}$. Commonly N=1 and $Y_1$ is a categorical feature. During training, using pairwise approach, each training example includes (1) value of contextual features $\{X_1, \ldots X_M\}$, (2) value of item-specific features for the first item $\{y_{1,1}, \ldots y_{1,n}\}$, (3) value of item-specific features for the second item $\{y_{2,1}, \ldots y_{2,n}\}$ and (4) label L indicating the order between the two items i.e. L=−1 if the first item should be ranked lower than the second item and L=1 otherwise. While querying, each query includes (1) the value of contextual features $\{x_1, \ldots x_M\}$ and (2) Z items, whose item-specific features have the values $\{y_{z,1}, \ldots y_{z,n}\}$ where z∈[1, Z].

During training, the training engine 108 can define a binary operator between two items, whose result is either true or false based on whether the item on the left-hand-side (LHS) of the operator should be ranked higher than the item on the right-hand-side (RHS) of the operator.

For each item-specific feature in $\{Y_1, \ldots Y_N\}$, the data analysis engine 110 can define two item-specific features to encode the LHS Vs RHS, i.e. $\{LHS\_Y_1, \ldots LHS\_Y_N\}$ and $\{RHS\_Y_1, \ldots RHS\_Y_N\}$ where $Y_i$, $LHS\_Y_i$ and $RHS\_Y_i$ have the same data type and their values have the same semantic. The feature set in the machine learning model 102 can be of the form $\{X_1, \ldots X_M, LHS\_Y_1, \ldots LHS\_Y_N, RHS\_Y_1, \ldots RHS\_Y_N\}$ of size M+2*N features.

For each training example $\{\{x_1, \ldots x_M\}, \{y_{1,1}, \ldots y_{1,n}\}, \{y_{2,1}, \ldots y_{2,n}\}, L\}$, the training engine 108 can process four training examples. The training examples are as follows $$\{x_1, \ldots x_m, y_{1,1}, \ldots y_{1,n}, y_{2,1}, \ldots y_{2,n}\} \text{ with label } L$$

$$\{x_1, \ldots x_m, y_{2,1}, \ldots y_{2,n}, y_{1,1}, \ldots y_{1,n}\} \text{ with label } -L$$

$$\{x_1, \ldots x_m, y_{1,1}, \ldots y_{1,n}, y_{1,1}, \ldots y_{1,n}\} \text{ with label } 0$$

$$\{x_1, \ldots x_m, y_{2,1}, \ldots y_{2,n}, y_{2,1}, \ldots y_{2,n}\} \text{ with label } 0 \qquad 50$$

It should be noted that the first training example can be the original training example, the second training example can be a negative example of the first training example with an observation that if the two items are swapped the model 102 prediction should be reversed. Training examples 3 and 4 are constraints stating that two similar items should rank the same.

Assume that the value of contextual features in the query are $\{x_1, \ldots x_m\}$, and the query needs to rank x items, i.e. $\{z_1, \ldots z_x\}$, whose item-specific features have the values $\{y_{z_i,1}, \ldots y_{z_i,n}\}$ where $z_i \in \{z_1, \ldots z_x\}$. Given two arbitrary items $z_i, z_j \in \{z_1, \ldots z_x\}$, the training engine 108 calculates function $F^+$ and $F^-$ as stated below $$F^+(z_i, z_j) = F(\{x_1, \ldots x_m\}, \{y_{z_i,1}, \ldots y_{z_i,n}\}, \{y_{z_j,1}, \ldots y_{z_j,n}\}) \qquad 51$$

$$F^-(z_i, z_j) = F(\{x_1, \ldots x_m\}, \{y_{z_j,1}, \ldots y_{z_j,n}\}, \{y_{z_i,1}, \ldots y_{z_i,n}\}) \qquad 52$$

The training engine 108 can then define $$\text{cap}(x, \text{minValue}, \text{maxValue}) = \min(\max(x, \text{minValue}), \text{maxValue})$$

Which can results in $$F(z_i, z_j) = \frac{\text{cap}(F^+(z_i, z_j), -1, 1) - \text{cap}(F^-(z_i, z_j), -1, 1)}{2} \qquad 53$$

where $-1 \leq F(z_i, z_j) \leq 1$. $F(z_i, z_j)$ is the reward to rank $z_i$ over $z_j$.

The training engine 108 can then find the permutation of $\{z_i, \ldots z_x\}$, i.e. $\{z_i', \ldots z_x'\}$ that maximizes the overall reward i.e. $\Sigma_{i \leq i \leq j \leq x} F(z_i', z_j')$.

FIG. 3 is a flow chart of an example process 300 for training a machine learning model. Operations of the process 300 can be implemented, for example, by the data analysis engine 110 and the training engine 108 of the system 100 of FIG. 1, or one or more data processing apparatus. Operations of the process 300 can also be implemented as instructions stored on a computer readable medium, where execution of the instructions can cause one or more data processing apparatus to perform operations of the process 300.

The system 100 obtains training dataset that includes a plurality of training samples (302). For example, the data analysis engine 110 can receive a training dataset 104. The training dataset 104 includes multiple training examples. Each training example includes one or more features and a corresponding target output. The target output corresponding to a training example refers to a preferred output of the model 102 in response to processing the one or more features of the training examples. For example, the training dataset 104 can be defined as having N training examples of the form $\{x_i, y_i\}, \ldots \{x_N, y_N\}$ where $x_i$ is a feature vector of the i-th training example and $y_i$ is the target output. Since the dimension of the feature vector $x_i$ is fixed, the training dataset can be represented using a table or a matrix.

The data analysis engine 110 generates a first matrix which is a sparse representation of the training dataset (304). For example, the data analysis engine 110 can iteratively select a feature from among the one or more features of the training dataset 104 for processing. The data analysis engine determines if the selected feature is a categorical feature. If the feature is determined to be not categorical, the data analysis engine 110 converts the value of the non-categorical features into discrete points in feature space. For example, the data analysis engine 110 after determining that a particular feature is not categorical (i.e., the particular feature is numerical), uses cubic spline interpolation method to convert the particular feature into discrete points using cubic spline interpolation. In some situations, Fast Fourier Transforms (FFTs) and/or wavelet transforms can be used to train the feature embeddings in the frequency domain to enable better model compression, i.e. to reduce the number of model parameters and to prevent overfitting with regularization. For example, a FFT (and/or wavelet) can be applied to train in the frequency domain, where the embeddings are the coefficients (i.e. weights) of the linear combination of frequencies.

The data analysis engine 110 can generate an encoded representation of the features using methods such as one-hot encoding to generate an encoded representation of the categorical features. In general, one-hot encoding converts categorical features into a vector of ones and zeros depending upon the category of the particular feature. For example, if a particular feature that identifies gender takes values Male and Female, the one-hot encoded representation will have two features such that the first feature of the representation will have a value of one (and the second feature will have a value zero) if the particular feature is a Male. Correspondingly, if the particular feature is female, first feature of the representation will have a value of zero (and the second feature will have a value one). After encoding each feature of the training dataset 102, the result can be represented using a table or a matrix that is referred to as the first matrix.

The data analysis engine 110 can factorize the matrix representation of the dataset that is referred to as the first matrix (306). For example, the data analysis engine 110 after generating a first matrix, uses singular value decomposition (SVD) to decompose the first matrix into one or more matrices. The SVD method can be represented using the following equation $A=U*\Sigma*V^T$ where A is an n×m matrix such that n>m, U is a n×m orthogonal matrix, $\Sigma$ is a m×m diagonal matrix (also referred to as the second matrix) and V is a m×m orthogonal matrix.

The data analysis engine 110 can generate the third matrix using the second matrix and a regularization term (308). For example, the data analysis engine 110 computes a third matrix $\Sigma^{-1}$ i.e. the inverse of the matrix $\Sigma$ using a regularization term $\lambda$. $\Sigma^{-1}$ can be calculated using the following equation $$\sum{}^{-1} = \text{diag}\left(\frac{\sigma_1}{\sigma_1^2 + \lambda}, \dots \frac{\sigma_r}{\sigma_r^2 + \lambda}\right) \qquad 24$$

where $\Sigma=\text{diag}(\sigma_1, \dots \sigma_r)$ and $\sigma_1, \dots \sigma_r$ are singular values.

The data analysis engine 110 can generate a fourth matrix based on one or more matrices and the third matrix (310). For example, equation 24 can be used to compute the inverse of the first matrix (also referred to as a fourth matrix) using equation 25

$$A^{-1} = V*\sum{}^{-1}*U^T = V*\text{diag}\left(\frac{\sigma_1}{\sigma_1^2 + \lambda}, \dots \frac{\sigma_r}{\sigma_r^2 + \lambda}\right)*U^T \qquad 25$$

The data analysis engine 110 can represent each feature of the training dataset using a vector that includes a predetermined number of adjustable parameters (312). For example, the data analysis engine 110 maps each feature of the training dataset to an embedding representation of a dimension K that is determined based on the unique values and/or levels (also referred to as cardinality of a feature) of the feature. For example, if the training dataset 104 has N training examples and each training example has M features, then the value of the j-th feature of the i-th training example can be represented using an embedding $E_{i,j}$ of dimension K where $E_{i,j} \epsilon R^K$. It should be noted that for a relatively small cardinality of a feature $x_j$, for each distinct value of a feature $x_j$, there is a distinct embedding $E_j$ resulting in $|x_j|$ distinct embedding for the feature j where $|x_j|$ is the cardinality of the categorical feature j. For features with relatively higher cardinality, the data analysis engine 110 can split the feature with relatively high cardinality into features with relatively low cardinality. For example a feature $x_j$ can be split into $x_{j1}$, $x_{j2}$, . . . $x_{jq}$. In such a scenario, the feature x can be represented using q distinct embedding $E_j$.

The training engine 108 can adjust the values of the adjustable model parameters of the machine learning model 102 (314). In some implementations, the adjustment can include iteratively training sequential models to predict a residue of the loss function until the loss can no longer be reduced, a measure model quality meets a quality threshold, or a size of the model has reached a maximum model size threshold (e.g., based on a memory constraint of a device training or invoking the model). For example, training engine 108 trains the machine learning model using K iterations by adjusting the values of the trainable parameters $c_k$ and the embedding representation. According to the machine learning model 102, the residue for a k-th iteration of the training process can be computed using equations 26 and 27. The residue can be represented in the following form $$R_{k,i} = y_i - \left(\sum_{m=1}^{K} c_k + \sum_{m=1}^{K} e^{\Sigma_{j=1}^{M} E_{i,j,m}}\right) \qquad 28$$

where $y_i$ is the target output for a sample i.

In some implementations, each subsequent training model can be trained to predict a combined residual value of previously generated models in the sequence of models. In other words, the target output for each subsequent training iteration is the residue from the previous iteration(s). The training process can generate an overdetermined system of N equation that can be transformed into logarithmic space using the following equation $$\sum_{j=1}^{M} E_{i,j,k} = \log(R_{k-1,i} - c_k) \qquad 31$$

where $R_{k-1,i} - c_k > 0$ for any $1 \le i \le N$.

The overdetermined system of N equations can further represented as $$A*X=B$$

where $B_i = \log(R_{k-1,i} - c_k)$.

The training engine 108 can calculate X in A*X=B of the overdetermined system using the following equation $$X = V*\Sigma^{-1}*U^T*B = A^{-1}*B \qquad 34$$

where $A^{-1}$ is computed using equation 25 and $B_i = \log \log (R_{k-1,i} - c_k)$.

In some implementations, instead of equation 34, the training engine 108 can calculate X using iterative methods, with regularization techniques of choice, e.g. L1 regularization (aka Lasso regression), or L2 regularization (aka ridge regression). The training engine 108 can select the value of $c_k$ based on the heuristics described below, or other appropriate heuristics. The training engine 108 can further optimize the selection of $c_k$ based on the intuition that by selecting an optimal value for $c_k$, the value of $|A*X-B|^2$ can be minimized. This can be represented using the function $L(c_k)$ where $$L(c_k)=B^T*(1-A*(A^T*A)^{-1}*A^T)*B \qquad 35$$

By calculating $C=1-A*(A^T*A)^{-1}*A^T$, equation 35 can take the form $$L(c_k)=B^T*C*B=\Sigma_i\Sigma_jC_{i,j}*\log(R_{k-1,i}-c_k)*\log(R_{k-1,j}-c_k) \qquad 36$$

In some implementations, the training engine 108 can use gradient descent algorithm which is a first-order iterative optimization algorithm to find the value of $c_k$ that minimizes $L(c_k)$. The training engine 108 can also use newton method, stochastic newton method which are second-order iterative optimization algorithms to find the value of $c_k$ that minimizes $L(c_k)$. The training engine 108 can also directly optimize the cost function using stochastic gradient descent (SGD) algorithm. The training engine 108 can also use coordinate descent algorithm to optimize the trainable parameters.

The training engine 108 can calculate the embedding representation of a value for a particular feature using an overdetermined system. For example, an overdetermined system A*X=B, can be solved for X using QR decomposition.

In some implementations, the error function can be different from Mean Square Error (MSE). In these implementations, instead of using the residue as the training label in each one of the K steps, the training engine 108 may calculate pseudo residue, i.e. the derivative of the loss function of a real intermediate variable representing the inner product of $A_i*X$, where $A_i$ is the row of the first matrix corresponding to the i-th training example. Let $B_i$ denote the pseudo residue calculated for the i-th training example. The training engine 108 may solve the overdetermined system A*X=B using any linear regression approaches described in previous sections.

In some implementations, in each of the K steps in the iterative training process, the training engine 108 can explicitly represent the intercept of the linear regression result as $$e^{\left(intercept+\Sigma_{j=1}^{M}E_{i,j,k}\right)}.$$

In some implementations, the training engine 108 can explicitly define a learning rate, e.g. $\gamma$, and modify the objective function from $$C+\sum_{k=1}^{K}e^{\left(\Sigma_{j=1}^{M}E_{i,j,k}\right)} \text{ to average}(y)+\gamma\times\sum_{k=1}^{K}\left(c_k+e^{\left(\Sigma_{j=1}^{M}E_{i,j,k}\right)}\right),$$

where average($\gamma$) is the average value of labels in the training dataset. In some implementations that support both intercept and learning rate, the objective function can be $$\text{average}(\gamma)+\gamma\times\sum_{k=1}^{K}\left(c_k+e^{\left(intercept_k+\Sigma_{j=1}^{M}E_{i,j,k}\right)}\right).$$

By introducing a fictitious single-valued categorical feature with one legitimate value, the above equation can be equivalent to $$C+\sum_{k=1}^{K}e^{\left(\Sigma_{j=1}^{M+1}E_{i,j,k}\right)}, \text{ where } C=\text{average}(y)+\gamma\times\sum_{k=1}^{K}c_k,$$

and the k-th dimension in the embedding for the fictitious single-valued categorical feature is $\log(\gamma)+intercept_k$.

Figure 4:
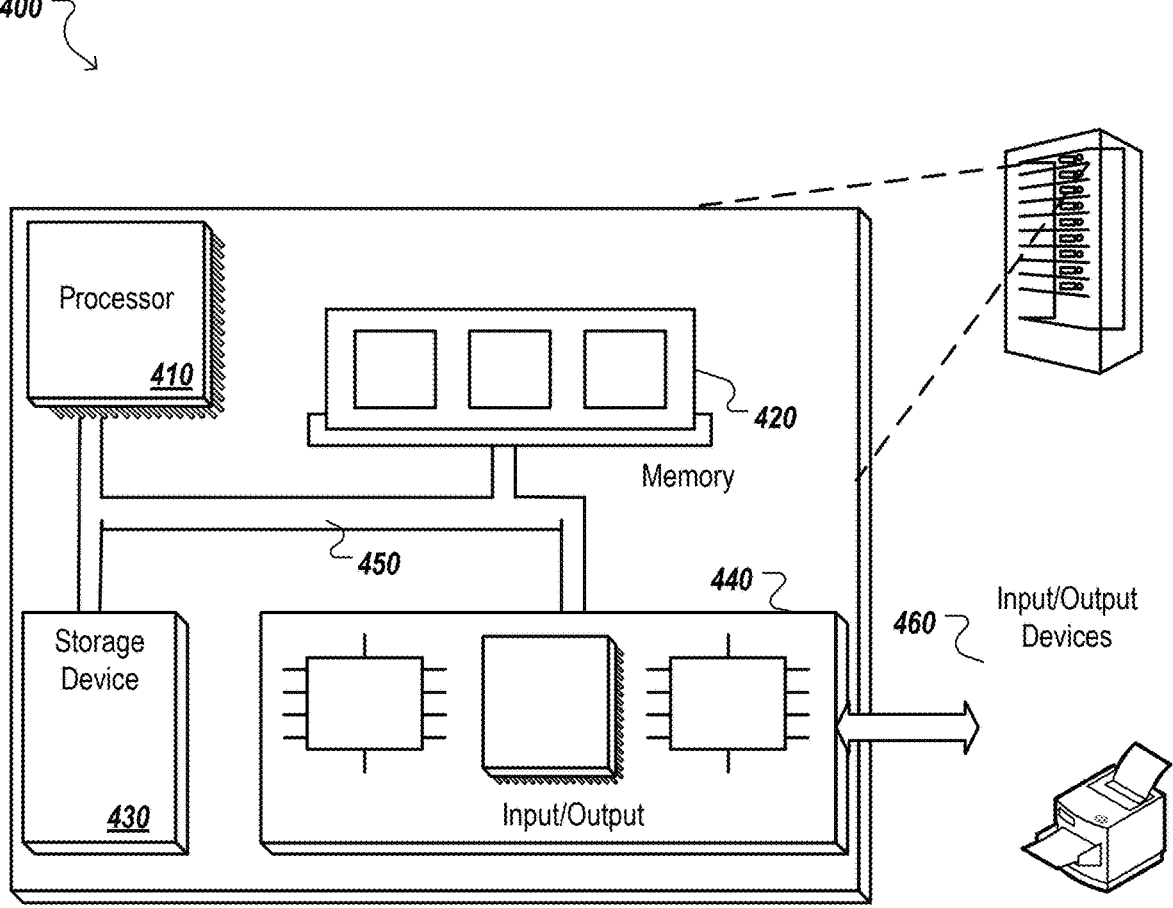
FIG. 4 is a block diagram of an example computer system that can be used to perform operations described.

FIG. 4 is block diagram of an example computer system 400 that can be used to perform operations described above. The system 300 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 370. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

obtaining, a training dataset comprising a plurality of training samples, wherein each training sample includes feature variables and one or more output variables;

generating, using the training dataset, a first matrix that is a sparse representation of the training dataset, wherein generating the first matrix comprises:

generating a categorical representation of the feature variables based on each numerical feature variable among the feature variables;

generating an encoded representation of each categorical feature variable among the feature variables by encoding each categorical feature variable;

factorizing a matrix representation of the training dataset to generate one or more matrices including a second matrix;

generating a third matrix using (i) the second matrix and (ii) a regularization term;

generating a fourth matrix based on (i) one or more matrices and (ii) the third matrix;

representing, each feature of the first matrix using a vector that includes a multiple adjustable parameters; and adjusting values of the adjustable parameters using a combination of (i) a loss function, (ii) the fourth matrix, and (iii) the first matrix, wherein adjusting the values of the adjustable parameters comprises iteratively generating sequential models to predict a residue of the loss function until a residue of the loss function can no longer be reduced, a measure of model quality meets a quality threshold, or a size of the model has reached a maximum model size threshold.

2. The computer-implemented method of claim 1, wherein the loss function is a loss function that provides a result corresponding to a given result provided by a particular loss function of the form $$R_{k,i} = y_i - \left( \sum_{m=1}^{K} c_k + \sum_{m=1}^{K} e^{\sum_{j=1}^{M} E_{i,j,m}} \right)$$

where R is a residue, $y_i$ is the output variable, c is a constant, and E is the encoded representation.

3. The computer-implemented method of claim 1, wherein generating the categorical representation of the feature variables based on each numerical feature variable comprises:

selecting a set of knots;

representing the numerical feature as either (i) a weighted sum of embedding, or (ii) a weighted average of the embedding;

generating the corresponding weights of the embedding using an interpolation technique; and representing each numerical variable in the first matrix using the corresponding weights.

4. The computer-implemented method of claim 3, wherein the interpolation technique for generating the corresponding weights of the embedding comprises spline interpolation.

5. The computer-implemented method of claim 1, further comprising:

generating a categorical representation of a set of ordinal features included in the training samples, including:

performing a Discrete Fourier Transform (DFT) or Discrete Wavelet Transform (DWT) on the set of ordinal features; and assigning categorical representations to the set of ordinal features based, at least in part, on the DFT or DWT transformation matrix.

6. The computer-implemented method of claim 5, wherein each subsequently generated model is trained to predict a combined residual value of previously generated models in a sequence of models.

7. The computer-implemented method of claim 1, wherein adjusting the values of the adjustable parameters comprises adjusting the values of the adjustable parameters iteratively until the size of the model has reached the maximum model size threshold based, at least in part, on a memory constraint of a device training or invoking the model.

8. The computer-implemented method of claim 1, wherein adjusting the values of the adjustable parameters further comprises generating a pseudo residue based on a derivative of the loss function.

9. A system, comprising:

obtaining, a training dataset comprising a plurality of training samples, wherein each training sample includes feature variables and one or more output variables;

generating, using the training dataset, a first matrix that is a sparse representation of the training dataset wherein generating the first matrix comprises:

generating a categorical representation of the feature variables based on each numerical feature variable among the feature variables;

generating an encoded representation of each categorical feature variable among the feature variables by encoding each categorical feature variable;

factorizing a matrix representation of the training dataset to generate one or more matrices including a second matrix;

generating a third matrix using (i) the second matrix and (ii) a regularization term;

generating a fourth matrix based on (i) one or more matrices and (ii) the third matrix;

representing, each feature of the first matrix using a vector that includes a multiple adjustable parameters; and adjusting values of the adjustable parameters using a combination of (i) a loss function, (ii) the fourth matrix, and (iii) the first matrix, wherein adjusting the values of the adjustable parameters comprises iteratively generating sequential models to predict a residue of the loss function until a residue of the loss function can no longer be reduced, a measure of model quality meets a quality threshold, or a size of the model has reached a maximum model size threshold.

10. The system of claim 9, wherein the loss function is a loss function that provides a result corresponding to a given result provided by a particular loss function of the form $$R_{k,i} = y_i - \left( \sum_{m=1}^{K} c_k + \sum_{m=1}^{K} e^{\sum_{j=1}^{M} E_{i,j,m}} \right)$$

where R is a residue, $y_i$ is the output variable, c is a constant, and E is the encoded representation.

11. The system of claim 9, wherein generating the categorical representation of the feature variables based on each numerical feature variable comprises:

selecting a set of knots;

representing the numerical feature as either (i) a weighted sum of embedding, or (ii) a weighted average of the embedding;

generating the corresponding weights of the embedding using an interpolation technique; and representing each numerical variable in the first matrix using the corresponding weights.

12. The system of claim 11, wherein the interpolation technique for generating the corresponding weights of the embedding comprises spline interpolation.

13. The system of claim 9, further comprising:

generating a categorical representation of a set of ordinal features included in the training samples, including:

performing a Discrete Fourier Transform (DFT) or Discrete Wavelet Transform (DWT) on the set of ordinal features; and assigning categorical representations to the set of ordinal features based, at least in part, on the DFT or DWT transformation matrix.

14. The system of claim 13, wherein each subsequently generated model is trained to predict a combined residual value of previously generated models in a sequence of models.

15. The system of claim 9, wherein adjusting the values of the adjustable parameters further comprises generating a pseudo residue based on a derivative of the loss function.

16. The system of claim 9, wherein adjusting the values of the adjustable parameters comprises adjusting the values of the adjustable parameters iteratively until the size of the model has reached the model size threshold based, at least in part, on a memory constraint of a device training or invoking the model.

17. A non-transitory computer readable medium storing instructions that, when executed by one or more data processing apparatus, cause the one or more data processing apparatus to perform operations comprising:

obtaining, a training dataset comprising a plurality of training samples, wherein each training sample includes feature variables and one or more output variables;

generating, using the training dataset, a first matrix that is a sparse representation of the training dataset wherein generating the first matrix comprises:

generating a categorical representation of the feature variables based on each numerical feature variable among the feature variables;

generating an encoded representation of each categorical feature variable among the feature variables by encoding each categorical feature variable;

factorizing a matrix representation of the training dataset to generate one or more matrices including a second matrix;

generating a third matrix using (i) the second matrix and (ii) a regularization term;

generating a fourth matrix based on (i) one or more matrices and (ii) the third matrix;

representing, each feature of the first matrix using a vector that includes a multiple adjustable parameters; and adjusting values of the adjustable parameters using a combination of (i) a loss function, (ii) the fourth matrix, and (iii) the first matrix, wherein adjusting the values of the adjustable parameters comprises iteratively generating sequential models to predict a residue of the loss function until a residue of the loss function can no longer be reduced, a measure of model quality meets a quality threshold, or a size of the model has reached a maximum model size threshold.

18. The non-transitory computer readable medium of claim 17, wherein the loss function is a loss function that provides a result corresponding to a given result provided by a particular loss function of the form $$R_{k,i} = y_i - \left( \sum_{m=1}^{K} c_k + \sum_{m=1}^{K} e^{\sum_{j=1}^{M} E_{i,j,m}} \right)$$

where R is a residue, $y_i$ is the output variable, c is a constant, and E is the encoded representation.

19. The non-transitory computer readable medium of claim 17, wherein generating the categorical representation of the feature variables based on each numerical feature variable comprises:

selecting a set of knots;

representing the numerical feature as either (i) a weighted sum of embedding, or (ii) a weighted average of the embedding;

generating the corresponding weights of the embedding using an interpolation technique; and representing each numerical variable in the first matrix using the corresponding weights.

20. The non-transitory computer readable medium of claim 17, wherein adjusting the values of the adjustable parameters comprises adjusting the values of the adjustable parameters iteratively until the size of the model has reached the model size threshold based, at least in part, on a memory constraint of a device training or invoking the model.

\*   \*   \*   \*   \*